United States Patent
Graf et al.

[19]

[11] Patent Number: 5,997,434
[45] Date of Patent: Dec. 7, 1999

[54] CONTROLLER FOR THE DRIVE TRAIN OF A MOTOR VEHICLE

[75] Inventors: Friedrich Graf, Regensburg; Erwin Achleitner, Obertraubling, both of Germany

[73] Assignee: Siemens Aktiengesellschaft, Munich, Germany

[21] Appl. No.: 09/108,943

[22] Filed: Jul. 1, 1998

[30] Foreign Application Priority Data

Jul. 1, 1997 [DE] Germany ............................ 197 27 993

[51] Int. Cl.$^6$ ................................................. F16H 59/64
[52] U.S. Cl. ............................. 477/98; 477/97; 477/100; 701/53; 60/295
[58] Field of Search ............................. 477/98, 97, 100, 477/107, 155; 60/295, 284; 701/53, 51

[56] References Cited

U.S. PATENT DOCUMENTS

| | | | |
|---|---|---|---|
| 5,265,693 | 11/1993 | Rees et al. ............................ | 701/53 X |
| 5,311,794 | 5/1994 | Takada et al. . | |
| 5,463,551 | 10/1995 | Milunas ................................ | 60/285 X |
| 5,468,196 | 11/1995 | Minowa et al. ..................... | 477/110 X |
| 5,517,410 | 5/1996 | Nakagawa et al. .................... | 701/51 |
| 5,606,855 | 3/1997 | Tomisawa .............................. | 60/285 X |
| 5,622,049 | 4/1997 | Kitamura et al. ..................... | 60/285 |
| 5,681,238 | 10/1997 | Minowa et al. ..................... | 477/121 X |

FOREIGN PATENT DOCUMENTS

| | | |
|---|---|---|
| 0474401A2 | 3/1992 | European Pat. Off. . |
| 2934477C3 | 6/1989 | Germany . |
| 4332456A1 | 3/1995 | Germany . |

*Primary Examiner*—Dirk Wright
*Assistant Examiner*—Peter T. Kwon
*Attorney, Agent, or Firm*—Herbert L. Lerner; Laurence A. Greenberg

[57] ABSTRACT

A controller for a drive train of a motor vehicle having an engine and an automatic transmission, includes an engine controller through which variables that influence the torque of the engine are controlled, a transmission controller through which shift processes of the automatic transmission are controlled, and an interface which connects the engine controller and the transmission controller to one another and through which data are transmitted to give the vehicle good handling. The interface is used to transmit a status signal which signals to the transmission controller that catalytic converter regeneration is taking place, and through which a shift process in the transmission is changed in the transmission controller.

6 Claims, 1 Drawing Sheet

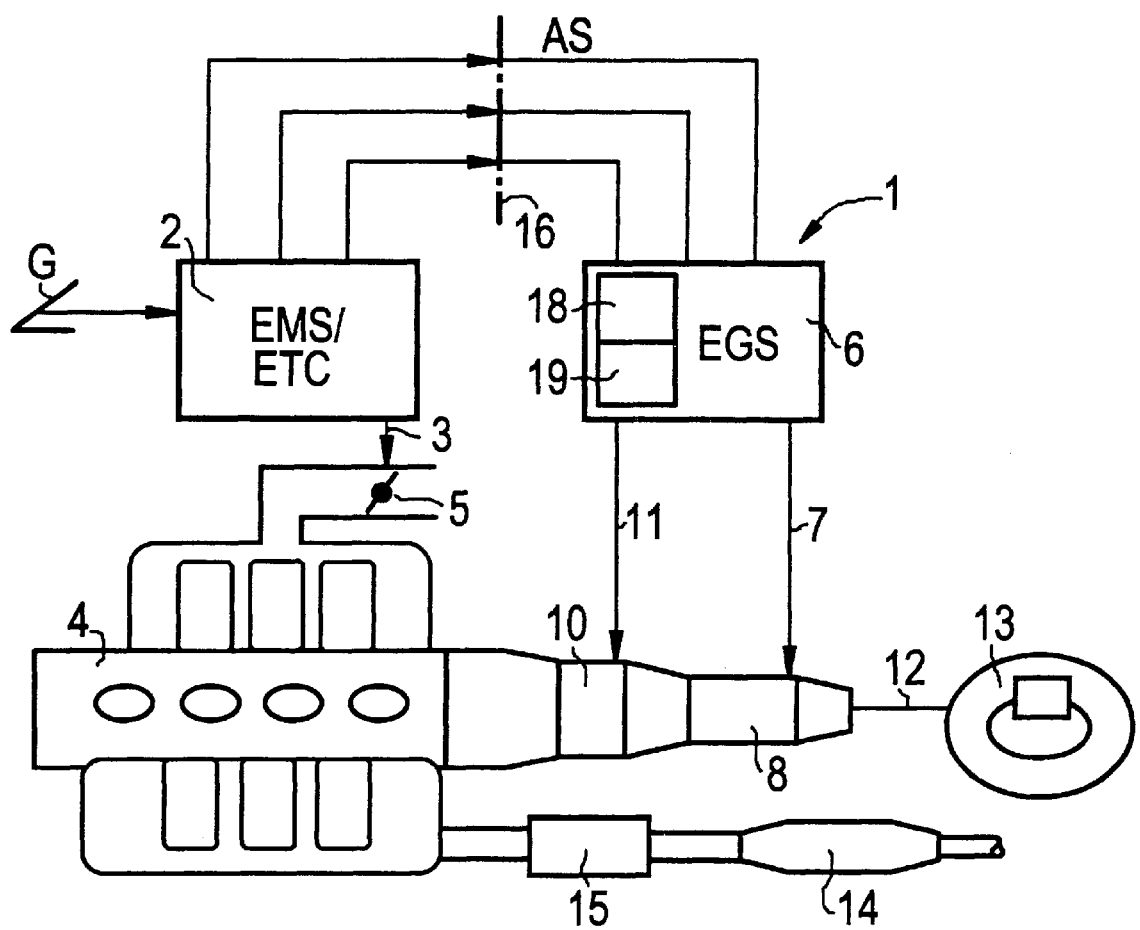

CONTROLLER FOR THE DRIVE TRAIN OF A MOTOR VEHICLE

BACKGROUND OF THE INVENTION

Field of the Invention

The invention relates to a controller for the drive train of a motor vehicle (a drive train controller) having an engine and an automatic transmission.

As disclosed in German Patent DE 29 34 477 C3, conventional transmission and engine controllers vary the ignition angle to reduce engine torque with the aim of improving the ease of gear shifting and of reducing the stress on the transmission. In the case of engine and transmission controllers that are to be developed as new items, one prime necessity is to reduce pollution emissions. In order to do that, local improvements are being aimed for, that is to say an improvement in the engine system on one hand and in the transmission system on the other hand. However, since the two systems influence one another, such improvements result in limitations to the operation of the motor vehicle.

In the case of a known motor vehicle drive train according to U.S. Pat. No. 5,311,794, the cylinder of a lean-burn engine has a plurality of inlet valves, one of which (a swirl control valve) is open when the engine load is relatively high and is closed when the load is low. The air-fuel mixture ratio is higher when that valve is closed than when it is open. The fact that the valve is switched on or off for changing its position is a signal to the transmission controller, which suppresses any transmission shift process then and for a time interval after the change. Special engine operating conditions are not taken into account in the process.

A known motor vehicle according to German Published, Non-Prosecuted patent application DE 43 32 456 A1 has an engine with an exhaust catalytic converter, having an exhaust purity level that reduces with age. The automatic transmission in that motor vehicle has at least one economy shift program and one sport shift program, and it is provided with a device through which the transmission is automatically switched to the sport program at the start of the engine warming-up phase, in order to heat the catalytic converter more quickly. The transmission is automatically switched back to the economy program once the sport program has been switched on for a time that becomes longer as the total operating duration or total distance driven becomes greater.

A motor vehicle drive train having a Diesel engine and a transmission has a fuel controller which is dependent on the performance required by the driver. A plurality of families of characteristics contain empirically derived data relating to exhaust components and fuel consumption, according to Published European Patent Application EP 0 474 401 A2. The transmission controller uses the vehicle speed and the performance requirement together with an evaluation of the families of characteristics to determine which of those gear ratios that may be used for a permissible engine operating range is the "optimum". The optimum gear ratio is indicated. The optimization is carried out on the basis of low fuel consumption and the exhaust characteristics, and those criteria can be weighted in the process. That results in adaptive correction of the data in the fields of characteristics for the most useful engine operating range.

SUMMARY OF THE INVENTION

It is accordingly an object of the invention to provide an integrated controller for the drive train of a motor vehicle, which overcomes the hereinafore-mentioned disadvantages of the heretofore-known devices of this general type and through the use of which disadvantageous mutual influences between an engine and a transmission are avoided, even in special engine operating modes.

With the foregoing and other objects in view there is provided, in accordance with the invention, in a motor vehicle including a drive train having an engine and an automatic transmission, a controller for the drive train, comprising an engine controller for controlling variables influencing a torque of the engine; a transmission controller for controlling shift processes of the automatic transmission; and an interface connecting the engine controller and the transmission controller to one another and transmitting a status signal, for signaling to the transmission controller that catalytic converter regeneration is taking place and for changing a shift process for the transmission in the transmission controller.

In accordance with another feature of the invention, the status signal reports to the transmission controller that the engine is warming up.

In accordance with a further feature of the invention, the transmission controller changes up-shifting in a direction of higher engine speeds upon reception of the status signal.

In accordance with an added feature of the invention, the transmission controller has a special family of shift characteristics for controlling the changed shift processes.

In accordance with an additional feature of the invention, the status signal signals that the engine is in a stratified charge mode and is transmitted from the engine controller to the transmission controller.

In accordance with a concomitant feature of the invention, the status signal signals a state change of the engine and is transmitted from the engine controller to the transmission controller.

The advantages of the invention are, in particular, that it allows an integrated functional control of the entire drive train of a motor vehicle. Shift processes in the transmission have no adverse effect on correct and environmentally friendly operation of the engine. The transmission controller is constructed in such a way that it interacts correctly with the engine controller both during lean-burn operation (with stratified charging) and during homogeneous operation of the internal combustion engine.

Other features which are considered as characteristic for the invention are set forth in the appended claims.

Although the invention is illustrated and described herein as embodied in a controller for the drive train of a motor vehicle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWING

The FIGURE of the drawing is a diagrammatic and schematic illustration of a drive train controller according to the invention for a motor vehicle.

DESCRIPTION OF THE PREFERRED EMBODIMENTS

Referring now in detail to the single figure of the drawing, there is seen a drive train controller 1 which contains an electronic engine controller or EMS (engine management system) 2, that controls an engine 4 over signal lines 3. The diagrammatic and schematic drawing shows a throttle valve 5 which is operated by the driver through a gas pedal or accelerator G, and possibly through an electrically driven power controller (also called an E-gas) which is known per se and is therefore not illustrated any further. The engine controller 2 furthermore controls the engine ignition timing. The abbreviation ETC in the drawing indicates that it can also carry out the function of an electronic traction controller.

An electronic transmission controller (EGS) 6 controls an automatic transmission 8 over a signal line 7. This automatic transmission 8 may be constructed as a fully automatic transmission based on epicyclic gear trains, or else as an automated manual shift transmission. If the transmission is provided with a torque converter 10 having a torque converter lockup clutch, then this torque converter lockup clutch is controlled by the transmission controller 6 over a signal line 11.

The drawing diagrammatically indicates a transmission shaft 12, which connects an output shaft of the transmission 8 to a driven axle, that is indicated herein by a driven wheel 13. An exhaust system 14 with a catalytic converter 15 is likewise only diagrammatically indicated.

The engine controller 2 and the transmission controller 6 are connected to one another by a plurality of signal lines, which may also be configured as a data bus and form an interface 16. The interface 16 is used for interchanging data relating to motor vehicle operating variables, and control signals, particularly in the form of physical description variables. The transmission controller 6 has one or more families of shift characteristics 18. The transmission controller 6 uses the shift characteristics to control transmission shift processes in a known manner as a function of driving state parameters, such as the engine speed and the gas pedal position. It also has a special family of shift characteristics 19, having a function which will be explained below.

Normally, in order to achieve fuel consumption that is as low as possible, internal combustion engines are operated with excess air in the fuel-air mixture, for example $\lambda > 1.2$. However, the excess air is detrimental to the effect of the catalytic converter 15, which operates most effectively at a value of $\lambda = 1$. One possible solution to that problem is to use catalytic converters which to a certain extent bind the nitrogen oxides that are produced during lean-burn operation. If the capacity available to do that is exhausted, that must be followed by an operating phase with a rich mixture ($\lambda < 1$) which allows the bound nitrogen oxides to be converted into non-toxic components, that is to say the catalytic converter has to be regenerated.

The catalytic converter regeneration that is required results in the engine frequently changing state between lean-burn and rich operation, to be precise every 1 to 3 seconds. Transmission state changes that occur in those phases when the engine state is changing, for example in the form of a gear shift, have been found to be highly disadvantageous for operation of the engine 4. That is due in particular to the precisely defined engine operation management when such a state change takes place, in which case a plurality of engine operating variables, such as the mixture formation and the amount of mixture injected, are controlled precisely.

A shift process in the transmission interferes with such an engine state change since the engine speed, and thus the engine operating point, change suddenly at the same time. In addition, transmission controller interactions with the engine controller can influence (increase or reduce) the engine torque, likewise influencing mixture formation and combustion.

According to the invention, the transmission controller 6 is therefore constructed in such a manner that, as long as catalytic converter regeneration is taking place, gear shift operations in the transmission 8 are changed, and in the worst case are suppressed. In order to do this, the engine controller 2 sends a status signal AS over the interface 16. The status signal AS signals to the transmission controller 6 that the engine is in such a special state and changes a shift process or a gear ratio change in the transmission 8. The changing or delaying of the shift process is achieved by using the special family of shift characteristics 19 or just by changing the shift characteristics themselves. If the current family of characteristics intend an up-shift operation, the special family of shift characteristics causes a change in the direction of higher engine speeds. When down-shifting, it produces a change in the direction of lower engine speeds.

In comparison with a simple suppression of a shift process through the use of an inhibit signal, the special family of shift characteristics also has the advantage of including protection against engine overspeeding. The status signal AS is also used to signal various engine operation state changes to the transmission controller 6, in particular the change between stratified charge operation with a lean mixture and operation with a rich mixture.

Driving situations in which the motor vehicle driver requires more torque from the engine 4 for safety reasons, for example with a kick-down command, are excluded from a change to or prevention of gear shift operations or gear ratio changes in the transmission. Increased torque can be emitted directly during catalytic converter regeneration since the engine is operated homogeneously during the regeneration and the higher torque is controlled by retarding the ignition angle.

Warming-up of a direct-injection engine is always carried out in a low gear, in the same way as in the case of an engine with manifold injection. The engine is also operated homogeneously in this case.

When the transmission is carrying out an up-shift operation, it is possible for the engine to leave the operating range with stratified charging, since the required torque may be too high for stratified charge operation at a low engine speed. When the engine 4 approaches a range boundary in the stratified charge mode, this is signaled to the transmission controller 6 through the interface 16, and any shift operation in the transmission is changed by the transmission controller. This is in particular due to the fact that a shift operation would have a disadvantageous effect on the fuel consumption.

We claim:
1. In a motor vehicle including a drive train having an engine and an automatic transmission, a controller for the drive train, comprising:
   an engine controller for controlling variables influencing a torque of the engine;
   a transmission controller for controlling shift processes of the automatic transmission; and
   an interface connecting said engine controller and said transmission controller to one another and transmitting a status signal for;
      signaling to said transmission controller that catalytic converter regeneration is taking place; and
      changing a shift process for the transmission in said transmission controller.

2. The drive train controller according to claim 1, wherein said status signal reports to said transmission controller that the engine is warming up.

3. The drive train controller according to claim 1, wherein said transmission controller changes up-shifting in a direction of higher engine speeds upon reception of the status signal.

4. The drive train controller according to claim 1, wherein said transmission controller has a special family of shift characteristics for controlling the changed shift processes.

5. The drive train controller according to claim 1, wherein said status signal signals that the engine is in a stratified charge mode and said status signal is transmitted from said engine controller to said transmission controller.

6. The drive train controller according to claim 1, wherein said status signal signals a state change of the engine and said status signal is transmitted from said engine controller to said transmission controller.

* * * * *